Patented Nov. 17, 1953

2,659,684

UNITED STATES PATENT OFFICE 2,659,684

SOLDERING FLUX COMPOSITION

Richard A. Neish, Library, Pa., assignor to United States Steel Corporation, a corporation of New Jersey No Drawing. Application December 12, 1951, Serial No. 261,380

8 Claims. (Cl. 148—23)

This invention relates to a soldering flux and, in particular, to a flux useful for soldering zinc or zinc-coated articles.

The soldering of galvanized steel has always been attended with difficulty because of the oxide or basic carbonate film usually present thereon. Chemical fluxes have been used heretofore but those which are satisfactorily effective leave a corrosive residue in or on the joint. In recent years, furthermore, the practice of applying chemical conversion coatings to galvanized products for improved paint bonding or corrosion resistance has become quite general and such coatings are very resistant to the usual chemical fluxes.

The object of my invention is to provide a flux for soldering galvanized or zinc articles, which will be equally effective whether or not the articles have a chemically formed coating thereon, yet will not leave a corrosive residue. A further object is to provide a flux which becomes effective at a temperature fairly close to the melting point of soft solder.

I have found that a dilute solution of ammonium acid fluoride and ammonium chloride gives excellent results as a flux for use preliminary to soldering zinc or galvanized articles. The solvent may be water but I prefer a solution of an alcohol and water in the ratio of about 2:1. The fluxing action may be improved by adding to the solution a small amount of an amine such as triethanolamine. The solution so modified is particularly effective as a flux for zinc surfaces, even though they have a chemically formed protective coating thereon. The flux in use tends to produce small amounts of volatile hydrofluoric and hydrochloric acids but leaves no corrosive residue. In addition, it produces no objectionable odor or fumes. The flux readily penetrates small crevices and reduces the surface tension of the molten solder. It is therefore particularly adapted for soldering joints which must be water tight.

The ammonium acid fluoride and ammonium chloride have a definite synergistic effect since neither one alone is effective as a flux. I prefer to use the two salts in the proportion of approximately 1:2 but the ratio may vary from about 1:1 to 1:4. As for concentration, values of 3% for ammonium acid fluoride and 6% for ammonium chloride are preferred. These concentrations may, however, range from 1 to 6% and from 2 to 12%, respectively. Smaller concentrations are not effective and greater concentrations do not produce any better results. Triethanolamine, if used, should be in approximately the same concentration as the ammonium acid fluoride. The solvent may be water alone or with a trace of a wetting agent if needed to cause the solution to wet the surfaces to be soldered. I prefer, however, to use a 2:1 solution of methanol and water. This solution wets oily as well as oil-free surfaces.

The preferred composition of my improved flux is:

30 g./l. ammonium acid fluoride
60 g./l. ammonium chloride
30 g./l. triethanolamine dissolved in the aforesaid solution of two parts methanol and one part water.

When the above flux without triethanolamine is applied to the work and heated, a thin film of salts is formed which reacts to cause the desired fluxing action at a temperature slightly above the melting point of a eutectic tin-lead solder. The presence of the specified amount of triethanolamine in the above composition increases the effectiveness of the flux and lowers the fluxing temperature to a point immediately below the melting point of a eutectic solder. The optimum amount of triethanolamine is about 30 g./l., as stated but the effective range is from 10 to 60 g./l. when used in the above fluxing composition. Greater proportions tend to make the fluxing reaction more severe than I consider desirable. A small part of the triethanolamine may remain as a residue, but it is slightly alkaline and does not accelerate corrosion after the soldering operation has been completed. The reason for the effect of the triethanolamine is not definitely known, but it seems probable that the amine forms the hydrochloric and hydrofluoric acid salts and frees these acids for fluxing when heated to the proper point.

The water solution of the two ammonium salts is acidic, but the alcohol solution is only slightly acidic and the triethanolamine tends to further neutralize the fluxing composition. Ammonium hydroxide may be added to make the flux slightly alkaline if desired, but an alkalinity greater than pH 8 is not as effective for fluxing.

While I have described the application of this fluxing composition to the soldering of galvanized steel, I have found that it is suitable for tin plate, black plate and uncoated sheet steel.

Although I have disclosed herein the present preferred embodiment of my invention, I intend to cover as well any change or modification

I claim:

1. A soldering flux consisting essentially of a dilute solution of ammonium acid fluoride and ammonium chloride.

2. A soldering flux as defined by claim 1 characterized by the solvent of said solution being water.

3. A soldering flux as defined by claim 1 characterized by the solvent of said solution being water and methyl alcohol.

4. A soldering flux as defined by claim 1 characterized by said solution including also a small amount of triethanolamine.

5. A soldering flux as defined by claim 1 characterized by the amounts of said salts, respectively, being in the proportion of from 1:1 to 1:4.

6. A soldering flux as defined by claim 1 characterized by the amounts of said salts being in the proportion of about 1:2 and the concentration of the ammonium acid fluoride being between 1 and 6%.

7. A soldering flux as defined by claim 6 characterized by said solution including triethanolamine in approximately the same concentration as the ammonium acid fluoride.

8. A soldering flux consisting essentially of a methanol-water mixture in the ratio of about 2:1 having dissolved therein about 30 g./l. of ammonium acid fluoride, about 60 g./l. of ammonium chloride and about 30 g./l. of triethanolamine.

RICHARD A. NEISH.

References Cited in the file of this patent

UNITED STATES PATENTS

| Number | Name | Date |
|---|---|---|
| 1,744,784 | McDonough et al. | Jan. 28, 1930 |
| 1,761,116 | Geisel | June 3, 1930 |
| 2,179,258 | Howarth | Nov. 7, 1939 |
| 2,330,904 | Miller | Oct. 5, 1943 |
| 2,596,466 | Bowden | May 13, 1952 |